March 16, 1948. L. R. BUCKENDALE 2,437,678
VEHICLE DRIVING MECHANISM
Filed April 7, 1944 4 Sheets-Sheet 1
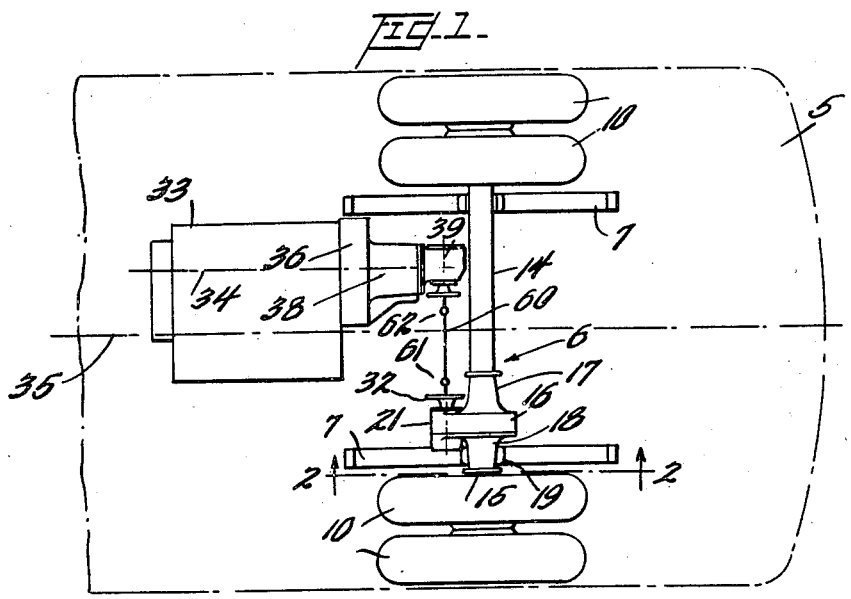
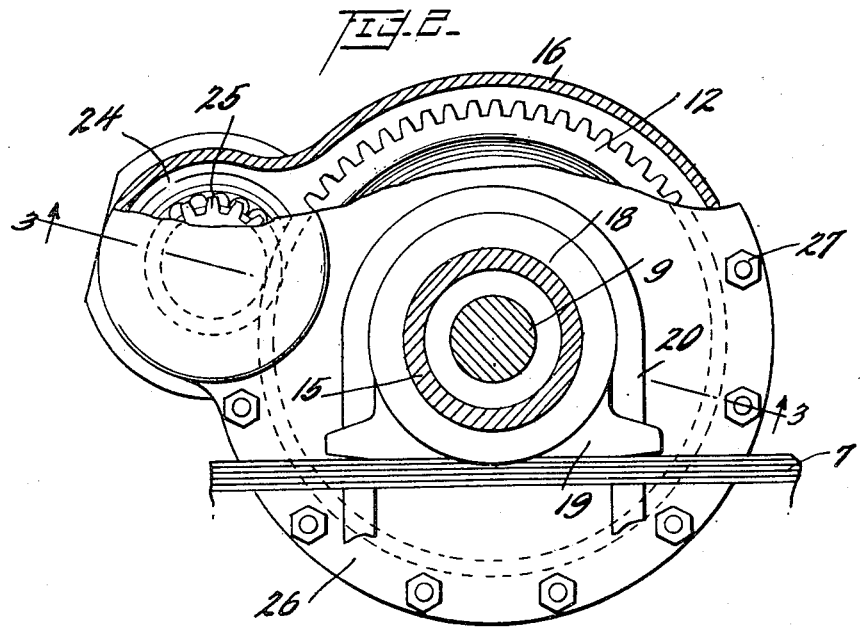
Inventor
Lawrence R. Buckendale,
By Strauch & Hoffman
Attorneys

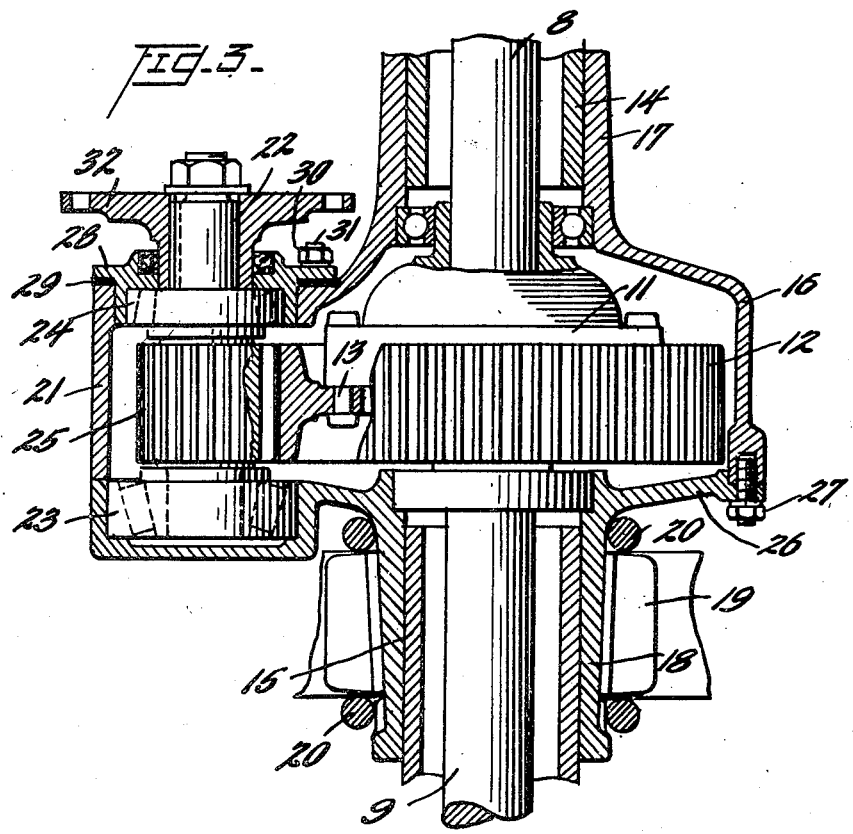
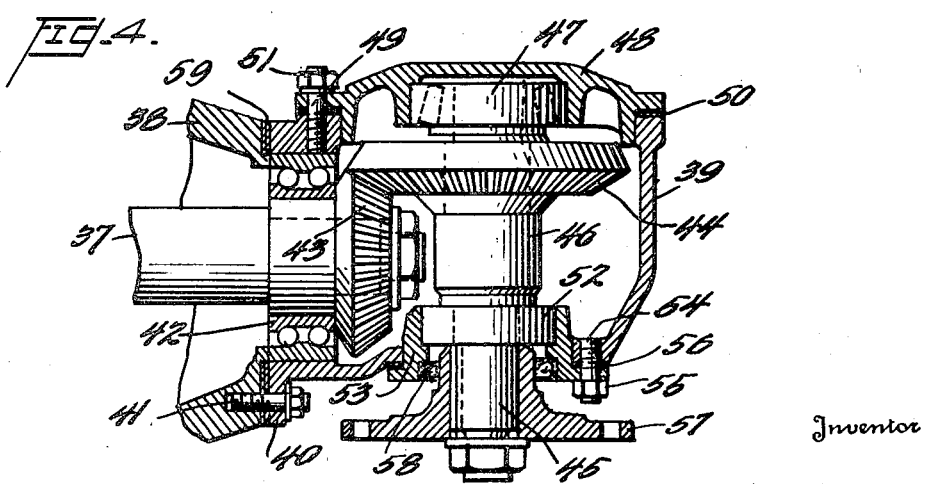

March 16, 1948.   L. R. BUCKENDALE   2,437,678
VEHICLE DRIVING MECHANISM
Filed April 7, 1944    4 Sheets-Sheet 3
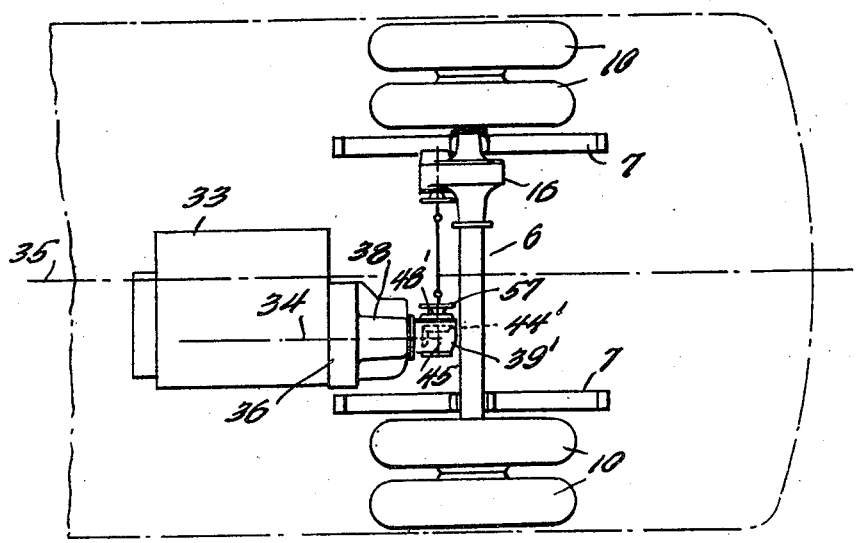
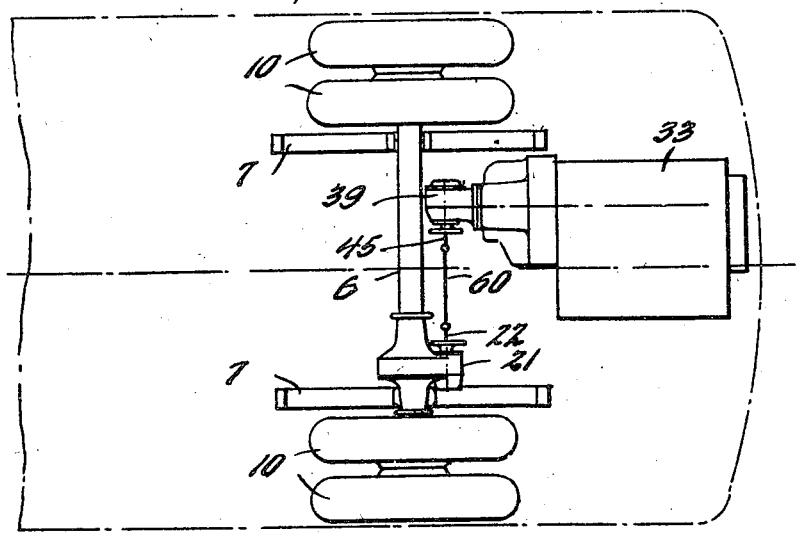
Inventor
Lawrence R. Buckendale,
By Strauch & Hoffman
Attorneys March 16, 1948.    L. R. BUCKENDALE    2,437,678
VEHICLE DRIVING MECHANISM
Filed April 7, 1944    4 Sheets-Sheet 4
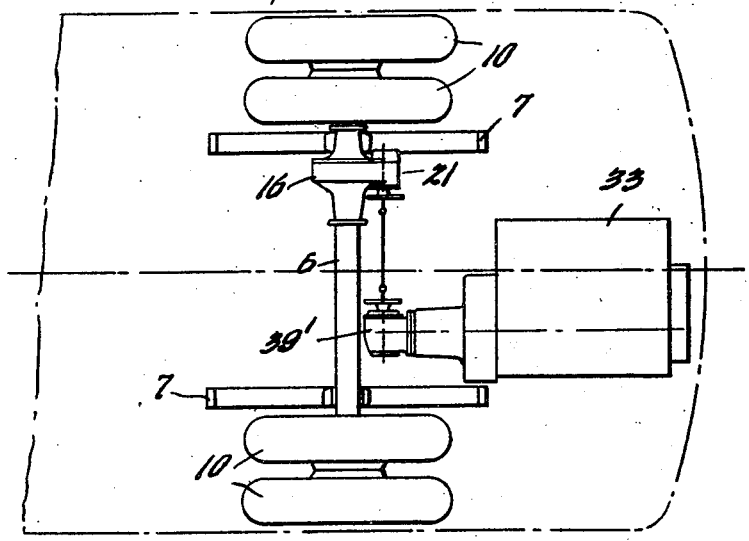
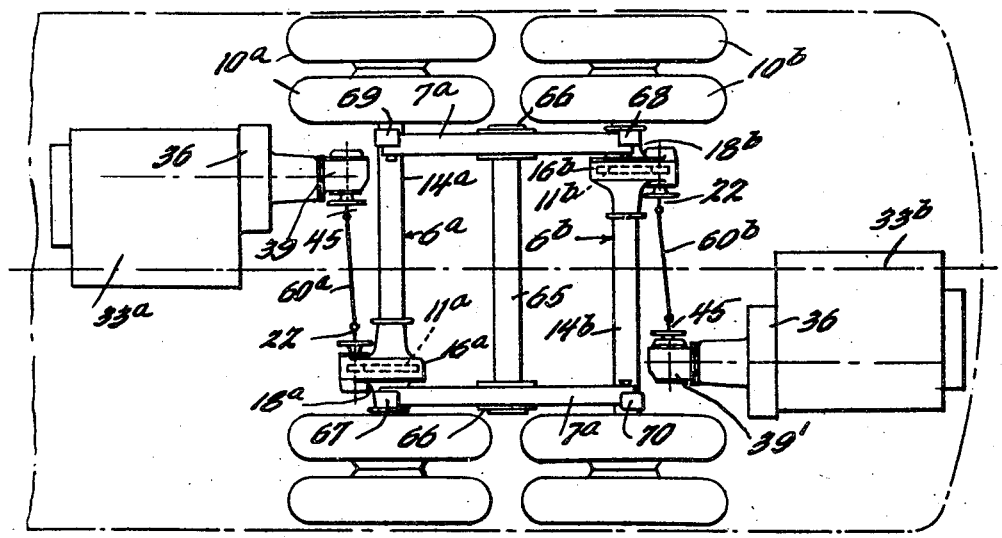
Inventor
*Lawrence R. Buckendale,*
By *Strauch & Hoffman*
Attorneys Patented Mar. 16, 1948

2,437,678

UNITED STATES PATENT OFFICE 2,437,678

VEHICLE DRIVING MECHANISM

Lawrence R. Buckendale, Detroit, Mich.

Application April 7, 1944, Serial No. 530,023

13 Claims. (Cl. 180—54)

This invention relates to vehicle driving mechanism and more particularly to driving mechanism of that type in which the power plant is mounted at the rear end of the vehicle.

Heretofore, various attempts have been made to devise a rear engine motor vehicle for the purpose of obtaining the obvious advantages of lower power losses, increased adhesion with greater tractive effort of the driving wheels on the road surface, and greater passenger or load carrying capacity in proportion to the overall length of the vehicle frame. As a practical solution of this problem, certain of these suggestions have shown more or less promise. However, they invariably require such relative arrangements of the engine, transmission, power transfer mechanism and final drive through the wheel axle differential, as to disadvantageously affect proper weight distribution, with a lack of flexibility in the selective mounting of the engine relative to the axle in different types of vehicles, excessive space requirements in the vehicle chassis, and mechanical complications in the construction of the several power transmitting units.

Accordingly, it is the principal object and purpose of my present invention to provide a vehicle driving mechanism, particularly designed to meet the space limitations of rear end mounting on the vehicle chassis, in which the engine, together with the power transmission and axle driving units, is mounted and arranged in very closely coupled relation with the vehicle axle, and in such relation to each other and to the vehicle center line as to obtain a more or less balanced weight distribution thereof with maximum stability.

Another object of the invention resides in the provision of a novel relative arrangement of the transfer unit and the differential drive unit with relation to each other and the vehicle axle, which permits the use of a comparatively short propeller shaft, disposed closely adjacent to and in substantially parallel relation with said axle.

A further object of my invention is to provide a very simple type of final spur gear driving connection between the propeller shaft and the differential axle driving unit.

The invention contemplates the mounting of the engine either forwardly or rearwardly of the vehicle axle and with its crank shaft axis in transversely spaced parallel relation to the vehicle center line, at either side thereof. To this end, I provide power transfer or take-off units of novel construction for interchangeable attachment to the transmission gear case directly mounted on one end of the engine cylinder block, so that with any selected mounting of the engine the wheel driving axle will be driven in the proper direction.

A still further object of the invention is to provide a drive mechanism of this kind in which the power take-off and differential units are located on opposite sides of the vehicle center line, with the latter, preferably, closely adjacent to one of the vehicle springs, whereby a common means may be employed for rigidly mounting the spring and differential housing upon the vehicle underframe or chassis.

My invention has for an additional object to provide a power plant and vehicle driving organization, as above characterized, in which the several power transmitting units are of simple and rugged construction, being easily and quickly assembled or disassembled and operable to efficiently transmit the developed power of the engine or motor, with minimum loss, to the vehicle driving axle.

The above and other subordinate objects of the invention are practically attained in the several embodiments thereof hereinafter described and subsequently defined in the subjoined claims, with reference to the accompanying drawings.

In the drawings wherein similar reference characters designate corresponding parts throughout the several views:

Figure 1 is a semi-diagrammatic plan view showing one desirable relative arrangement of the power plant and the several units of the drive mechanism forwardly of the rear vehicle axle;

Figure 2 is a vertical sectional view taken substantially on the line 2—2 of Figure 1 the differential housing structure being partly shown in section;

Figure 3 is a horizontal sectional view taken substantially on the line 3—3 of Figure 2;

Figure 4 is a horizontal sectional view through the housing of the transmission power take-off unit;

Figure 5 is a semi-diagrammatic plan view, similar to Figure 1, but showing the engine power shaft and several drive units located at the opposite side of the vehicle center line, with respect to Figure 1;

Figure 6 is a similar view with the same arrangement of the several drive units as in Figure 1, rearwardly of the vehicle axle;

Figure 7 is a semi-diagrammatic plan view showing the relative arrangement of the drive units as in Figure 5, rearwardly of the vehicle axle; and Figure 8 is a similar view illustrating an application of my invention to a six wheel heavy duty vehicle, having dual rear driving axles.

With further reference to the drawings, and for the present more particularly to Figure 1 thereof, for the purposes of this explanation, I have diagrammatically illustrated the rear end portion of a motor vehicle body 5, the rear wheel driving axle unit 6 and conventional spring suspension means, in the form of the familiar longitudinally extending side springs 7 of the laminated or superimposed leaf type. However, insofar as the essential features of the present invention are concerned, various other types of spring suspension may be employed.

The axle unit 6 includes the usual divided wheel driving shaft, which in this case, comprises the long and short axially aligned shaft sections 8 and 9, respectively, to the outer ends of which the road wheels 10 are suitably fixed. The inner opposed ends of said shaft sections are connected by the differential driving unit 11, which is of the well known construction (not shown), having drive pinions mounted in a spider rotating about the axle shaft axis and meshing with side gears on the shaft sections. As herein shown a ring gear 12 of the spur type is rigidly bolted to the differential spider as indicated at 13, and has its teeth disposed in parallel relation to the axis thereof.

The axle unit also includes an outer casing, 14 and 15 respectively for each drive shaft section 8 and 9, while the differential unit 11 is enclosed within a housing 16, having a tubular hub extension 17 and 18 on each side wall thereof to telescopically receive opposing end portions of the axle casings 14 and 15 respectively.

As will be seen in Figure 1, the differential unit 11 and its housing 16 are located closely adjacent to the inner side of one of the vehicle springs 7. The hub 18 of said housing is seated in a pillow block 19, positioned on the top of said spring at its approximate center, and said hub and block are securely fixed in position relative to the spring by the U-shaped clamping bolts 20 which embrace said hub at the inner and outer sides of the spring and rigidly clamp the central part of the spring to a supporting bracket (not shown), fixed to one side rail of the vehicle underframe or chassis. The axle casing 14 is secured upon the other side spring 7 in a similar manner.

The differential housing 16, at one side thereof, has an integrally formed lateral extension 21 in which the driving shaft 22 is journalled in the spaced anti-friction bearings 23 and 24 respectively, between which said shaft is formed with the spur pinion 25, the teeth of which are in mesh with the teeth of the differential ring gear 12. Preferably, for convenient assembly, the housing 16 and extension 21 includes a detachable side or cover section 26, having hub 18 and secured to the body section of the housing by bolts 27, shown in Figure 3. Also the bearing 24 may be mounted in a detachable cover plate or cap 28 for an opening in the opposite side wall of the housing extension 21. One or more shim plates 29 may be positioned between the cap flange and the housing wall to properly adjust the bearings when the nuts 30 on the stud bolts 31 are tightened against said flange.

One end of the shaft 22 carries a universal joint connecting flange 32 for the connection of said shaft with one end of the propeller shaft, as will be presently described.

The power plant or engine is conventionally illustrated at 33 and is suitably mounted in the vehicle chassis forwardly of the axle 6, with its crank shaft 34 disposed at one side of and in spaced parallel relation to the longitudinal center line of the vehicle, indicated at 35, while a minor part of the engine unit extends transversely on the opposite side of said center line. The transmission or change speed gear unit 36 is directly attached to the engine cylinder block and extends rearwardly therefrom towards the axle unit 6, and closely adjacent to the inner side of the other of the side springs 7. Of course, suitable means is provided for shifting the gears to transmit power from the engine shaft to the transmission output shaft 37 at selected variable speeds. To the rear end of the transmission housing 38 the power take-off or transfer gear box 39 is attached, the attaching flange 40 thereof being detachably secured to the housing end wall by bolts 41. The rear end of the transmission output shaft 37 is supported in a suitable type of anti-friction bearing 42 mounted in the gear box 39, and carries a bevel gear 43 splined or otherwise fixed thereto. This gear is in mesh with the bevel gear 44 splined to the power output shaft 45 between a central enlarged section 46 of said shaft and the inner race ring of an anti-friction bearing 47 which supports one end of the shaft 45 in a cap or cover member 48 for one side of the gear box. The attaching flange of said cover is apertured to receive stud bolts 49 fixed in the body wall of the gear box and one or more shims 50 may be interposed between said wall and said cap flange so that when nuts 51 are tightened on said bolts, the bearing 47 will be properly adjusted and gear 44 positioned in abutting contact with the end shoulder of the shaft section 46.

The other end of shaft 45 is supported in the anti-friction bearing 52 mounted in the closure member 53 for an opening in the opposite side wall of the gear box, said member being detachably secured to the box wall by stud bolts 54 and nuts 55. Bearing adjusting shims 56 are also arranged between the box wall and the attaching flange of said closure member. To the externally projecting end of said shaft the hub of the universal joint member or flange 57 is keyed or splined and between said hub and a recess in the wall of the member 53 a conventional type of oil seal 58 is arranged.

In order to accurately adjust the power transfer or take-off unit and position the shaft 45 thereof in the same transverse vertical plane with the shaft 22 of the differential drive unit, one or more adjusting shims 50 are positioned between the attaching flange 40 of the gear box 39 and the end wall of the transmission housing 38. The shafts are then connected by suitable flexible or universal joints, 61 and 62, respectively, with the opposite ends of a short propeller shaft 60. It will be noted that the shafts 22 and 45 and propeller shaft 60 are closely adjacent to the axle unit 6 and in substantially transverse parallel relation therewith. The shaft 22 of the differential drive may be out of axial alignment with shaft 45 so that the propeller shaft will be more or less vertically inclined.

It will be evident from the above that my invention provides a very compact, space conserving, assembly of the engine, transmission and power take-off units, in closely coupled relationship with the differential and wheel driving unit 6. The substantially direct, short propeller shaft connection between the transmission power take-off and the differential reduces power losses to a minimum and by locating the propeller shaft closely adjacent to one side of the axle unit 6, and substantially parallel therewith, a certain measure of protection is afforded to the propeller shaft against possible damage from external forces. The arrangement of the transmission and power take-off in the vertical plane of the engine crank shaft axis at one side of the vehicle center line, with the differential drive unit at the opposite side thereof, and the use of spur gearing in the latter, provides a more or less balanced distribution of the load on the vehicle wheels and a smooth transmission of power to the wheel shafts in all relative vertical positions of the axle unit and the engine shaft.

In Figure 1 of the drawings, I have shown the spur drive differential unit incorporated in the wheel axle unit 6 at the left hand side of the vehicle center line, while the engine, transmission and power take-off units are on the right hand side thereof. In Figure 5 of the drawings, such relative arrangement of the power transmission and driving units is reversed, the differential being at the right hand side of the vehicle center line, while the engine, transmission and power take-off are on the left hand side thereof. The construction of the several units is substantially the same as that above described in connection with Figure 1, the notable difference being in the location of the bevel gear 44' in Figure 5 at the end of the propeller drive shaft 45 of the power take-off unit which is provided with the universal joint connecting member 57, said shaft end extending through an opening provided in the cover plate 48' for the gear box 39'. This is necessary in order to drive the propeller shaft in the proper direction for the forward drive of the vehicle wheel, since the engine crank shaft rotates in the same direction as in Figure 1. Otherwise the gear box 39' in external form and dimensions, is the structural counterpart of the gear box 39 so that the two power take-off units are readily interchangeable with the same transmission case or housing 38, as may be required for the elected mounting and arrangement of said units with respect to the vehicle center line.

In Figure 6 I have shown the same relative arrangement of the engine and power transmission unit with respect to the vehicle center line as in Figure 1. In this case however, the engine, change speed transmission and power take-off units are mounted rearwardly of the vehicle axle unit 6. The differential spur drive unit for the axle shaft is also arranged with the housing extension 21 and shaft 22 disposed at the rear side of the vehicle axle. The shaft may thus be connected in closely coupled relation with the shaft 45 of the power take-off unit 39 by the short propeller shaft 60 disposed in closely adjacent transversely parallel relation with the axle unit, as in Figure 1.

In Figure 7 I have shown the reverse arrangement of the engine and power transmitting units with respect to the vehicle center line for the right hand drive of the vehicle axle shaft, as in Figure 5, said engine and transmission unit being mounted rearwardly of the vehicle axle, as in Figure 6. In this case, of course, the same type of power take-off unit 39', as shown in Figure 5, is employed. Otherwise the construction and arrangement of the several elements in relation to the vehicle axle unit is the same as above described in connection with Figure 6.

In the case of a four wheel drive vehicle, it will be apparent that any one of the above-described embodiments of my invention may also be applied in a similar manner for the purpose of driving the front vehicle axle shafts. Of course, the power will be transmitted to the vehicle wheels through the usual universal joints in the wheel steering knuckles.

In Figure 8 of the drawings I have shown an application of my present invention to a six wheel type vehicle, in which front and rear pairs of driving wheels, 10a and 10b, respectively, are provided at the rear end of the vehicle body, with independently driven axle unit 6a and 6b, respectively therefor. The front axle unit 6a is provided with a spur gear driven differential at the left hand side of the vehicle center line, as in Figure 1, and generally indicated at 11a. The rear axle unit 6b is provided at the right hand side of the vehicle center line with a similar differential driving unit 11b.

Between the axle units 6a and 6a and in parallel relation therewith, a bar 65 is suitably fixed in the vehicle chassis or underframe and is provided at its opposite ends with the seats 66 upon which the central portions of longitudinally extending springs 7a are suitably mounted. The hub extension 18a of the housing 16a for differential unit 11a is provided with suitable means generally indicated at 67 for securely attaching the forward end of the left hand spring 7a to said housing. Similarly the hub extension 18b for housing 16b of the differential 11b is provided with a similar securing or attaching means 68 for the rear end of the right hand spring 7a. The front end of the latter spring and the rear end of the left hand spring 7a are secured or attached to the front and rear axle casings 14a and 14b, respectively, by suitable means 69 and 70 on the respective axle casings.

Engine 33a, with the arrangement of transmission unit 36 and power-take-off unit 39, as in Figure 1, is mounted forwardly of the front driving axle unit 6a and at the right hand side of the vehicle center line. While the crank shaft axis is in parallel relation to the vehicle center line it is somewhat more widely spaced therefrom than in Figure 1, as the spring 7a does not extend forwardly of the wheel axle unit 6a. Rearwardly of the rear axle drive unit 6b the engine 33b with the transmission 36 and power-take-off assembly 39', as in Figure 7, is mounted at the right hand side of the vehicle center line and in the same relation thereto as the forward engine 33a and transmission and power-take-off assembly. Looking toward the front of the vehicle from the back thereof, the engine 33a rotates counter-clockwise and the engine 33b rotates clockwise. Therefore, in the arrangement shown in Figure 8 the arrangement of the gears in the power-take-off 39 will be the same as in Figure 1 and the arrangement of the gears in the power-take-off 39' will be the same as in Figures 5 and 7. In this case I have shown the power-take-off units 39 and 39' spaced from the respective axle units 6a and 6b for a somewhat greater distance than in the previously described embodiments of my invention. It will therefore be noted that the respective propeller shafts 60a and 60b are not in parallel relation with the adjacent axle units, but in a slight transversely diagonal position in the horizontal plane between the power take-off shaft 45 and differential drive shaft 22. However, if desired, the engine and the associated transmission power take-off unit may be longitudinally positioned with relation to the respective wheel driving axles as in Figures 1 and 7, so that the power take-off and differential drive shaft will be in the same transverse vertical plane and the propeller shaft in transverse parallel relation to the respective wheel driving axles.

From the above, it will be seen that, in this dual arrangement for independently driving the spaced pairs of rear vehicle wheels, I preserve the same balanced weight distribution and closely coupled relation of the power plant and driving units of the respective mechanisms, as in the previously described embodiments of the invention, applied to a single pair of driving wheels.

Of course, it will be understood that, for the purpose of servicing the power plant, the vehicle body will be provided with access openings in its side walls or its rear end wall, as may be required.

From the foregoing description the construction, application, and several advantages of the described embodiments of my invention will be readily understood. The novel combination and relative arrangement of the engine and power transmitting unit with the final spur gear driven differential, permits of the selective mounting of the power plant at the front or rear of the vehicle axle and at either side of the vehicle center line, as the required space may be available in different types of vehicles designed for a variety of different purposes and having bodies of different structural forms. Such flexibility in the application of my invention to meet practical requirements is obtained with the use of transmission and differential housings of uniform design and simply constructed, interchangeable power take-off units. Thus the number of parts that must be carried in stock is reduced to a minimum.

The closely coupled relation between the power take-off and differential and the spur gear drive for the latter, obviates excessive power losses and by arranging the power take-off and propeller shaft between the vehicle springs and closely adjacent to the vehicle axle these parts will be protected against serious damage.

It will further be seen that the several elements of my invention are of simple and rugged structural form, efficient and reliable in functional operation, and can be readily disassembled and reassembled for the purpose of inspection and repair.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a vehicle drive axle, a gear driven differential unit at one side of the vehicle center line for driving said axle, said unit including a driving shaft therefor in laterally offset substantially parallel relation to the vehicle axle, an engine mounted with its crankshaft at the opposite side of the vehicle center line, transmission and power-take-off units in successive connected relation with the engine, said power-take-off unit having an output shaft substantially parallel with the vehicle axle, and a propeller shaft operatively connecting said output shaft with the differential driving shaft.

2. The combination defined in claim 1, in which the engine crank shaft axis is in spaced substantially parallel relation to the vehicle center line and said transmission and take-off units extend axially of the crank shaft from the engine substantially to the vehicle axle.

3. The combination defined in claim 1, in which said propeller shaft, power output shaft, and differential driving shaft are positioned in a common transverse vertical plane.

4. In combination with a vehicle drive axle, a gear driven differential unit at one side of the vehicle center line, adjacent to one of the vehicle springs, for driving said axle, said unit including a driving shaft therefor in laterally offset relation to the axle, an engine mounted at the opposite side of the vehicle center line, transmission and power-take-off units connected with the engine and extending longtiudinally therefrom in successive order towards the vehicle axle, said take-off unit including a power output shaft, and means operatively connecting said power output shaft to the differential driving shaft.

5. The combination defined in claim 4, in which said power output shaft and the differential driving shaft are positioned in a common transverse vertical plane closely adjacent to the vehicle axle.

6. In combination with a rear vehicle driving axle, a differential driving unit for said axle at one side of the vehicle center line, having a driving shaft forwardly spaced from said axle in substantially parallel relation thereto, an engine forwardly spaced from the vehicle axle and having its crank shaft axis at the opposite side of the vehicle center line with respect to the differential unit and in transversely spaced substantially parallel relation thereto, transmission and power-take-off units extending rearwardly from the engine in longitudinally successive order, said take-off unit having a power output shaft in forwardly spaced substantially parallel relation to the axle, and propelling means connecting said shaft to the differential driving shaft.

7. The combination defined in claim 6, in which said power output shaft and differential driving shaft are positioned in a common transverse vertical plane closely adjacent to the forward side of the vehicle axle.

8. In combination with a rear vehicle driving axle, a differential driving unit for said axle at one side of the vehicle center line, having a driving shaft rearwardly spaced from said axle in substantially parallel relation thereto, an engine rearwardly spaced from the vehicle axle and having its crank shaft axis at the opposite side of the vehicle center line with respect to the differential unit and in transversely spaced substantially parallel relation thereto, transmission and power-take-off units extending forwardly from the engine in longitudinally successive order, said take-off unit having a power output shaft in rearwardly spaced substantially parallel relation to the axle, and propelling means connecting said shaft to the differential driving shaft.

9. The combination defined in claim 8 in which said power output shaft and differential driving shaft are positioned in a common transverse vertical plane closely adjacent to the rear side of the vehicle axle.

10. In combination with longitudinally spaced front and rear axle units for independently driving spaced pairs of rear vehicle wheels, a differential driving unit associated with each axle unit and disposed on the opposite side of the vehicle center line with respect to the differential of the other axle unit, said differential units having driving shafts disposed in forwardly and rearwardly spaced relation to the front and rear axles, respectively, and substantially parallel therewith, an engine unit forwardly spaced from the front axle, a second engine unit rearwardly spaced from the rear axle, said engine units being respectively mounted on the opposite sides of the vehicle center line with relation to the front and rear differential units, respectively, and with their crank shafts in symmetrical, transversely spaced, substantially parallel relation to said vehicle center line, and power transmitting connections between the respective engine crank shafts and the driving shaft of the associated differential unit.

11. The combination defined in claim 10 in which each of said power transmitting connections includes power transmission and take-off units operatively connected with one end of the engine crank shaft and extending in longitudinal succession therefrom toward the associated wheel axle unit.

12. The combination defined in claim 10 in which each of said power transmitting connections includes power transmission and take-off units operatively connected with one end of the engine crank shaft and extending in longitudinal succession therefrom toward the associated wheel axle unit, and a propeller shaft extending transversely across the vehicle center line closely adjacent to the axle, and connecting the power-take-off output shaft with the drive shaft of the axle differential unit.

13. In combination with a vehicle driving axle; a differential driving unit for said axle at one side of the vehicle center line, having a driving shaft spaced from said axle and in substantially parallel relation thereto; an engine spaced from the vehicle axle and having its crank shaft axis at the opposite side of the vehicle center line with respect to said differential unit and in traversely spaced substantially parallel relation to the vehicle center line, said differential unit and engine being adapted to have their relative positions reversed with respect to the vehicle center line; transmission and power-take-off units extending from the engine in longitudinally successive order towards said driving axle, said power-take-off unit having a power output shaft in spaced substantially parallel relation to said driving axle and driven to rotate in the same direction as said differential driving shaft irrespective of which side of the vehicle center line the engine is located; and propelling means connecting said power output shaft to said differential driving shaft.

LAWRENCE R. BUCKENDALE.

REFERENCES CITED

The following references are of record in the file of this patent:

UNITED STATES PATENTS

| Number | Name | Date |
| --- | --- | --- |
| 2,132,450 | Wolf | Oct. 11, 1938 |
| 2,032,876 | Haltenberger | Mar. 3, 1936 |
| 1,642,221 | Young | Sept. 13, 1927 |
| 2,047,011 | Dillon | July 7, 1936 |
| 1,831,714 | Latshaw | Nov. 10, 1931 |

FOREIGN PATENTS

| Number | Country | Date |
| --- | --- | --- |
| 362,633 | Great Britain | Dec. 10, 1931 |
| 780,732 | France | Feb. 11, 1935 |
| 326,277 | Italy | Mar. 9, 1935 |
| 362,634 | Great Britain | Dec. 10, 1931 |